United States Patent [19]
Johannsen

[11] 4,057,089
[45] Nov. 8, 1977

[54] PNEUMATIC TIRE FOR MOTOR VEHICLES

[75] Inventor: Peter Johannsen, Hannover, Germany

[73] Assignee: Continental Gummi-Werke Aktiengesellschaft, Hannover, Germany

[21] Appl. No.: 633,981

[22] Filed: Nov. 20, 1975

[30] Foreign Application Priority Data
Nov. 21, 1974 Germany .............................. 2455130

[51] Int. Cl.² ............................................ B60C 11/06
[52] U.S. Cl. ................................................ 152/209 R
[58] Field of Search ............ 152/209 R, 209 D, 209 B

[56] References Cited
U.S. PATENT DOCUMENTS

| | | | |
|---|---|---|---|
| 1,127,517 | 2/1915 | Richardson | 152/209 R |
| 2,770,279 | 11/1956 | Harrison | 152/209 R |
| 3,237,669 | 3/1966 | Travers | 152/209 R |
| 3,457,981 | 7/1969 | Verdier | 152/209 B |
| 3,674,077 | 7/1972 | Verdier | 152/209 R |
| 3,799,231 | 3/1974 | Boileau | 152/209 R |
| 3,848,651 | 11/1974 | French | 152/209 R |

Primary Examiner—Drayton E. Hoffman
Attorney, Agent, or Firm—Walter Becker

[57] ABSTRACT

A pneumatic tire for motor vehicles having a circumferential tread surface with molded-in grooves extending in a direction transverse to the circumferential direction of the tire, in which the grooves extend from a central circumferential tread surface section of the tire toward both lateral tire sides while following the curvature of a parabola of a second order.

4 Claims, 3 Drawing Figures

PNEUMATIC TIRE FOR MOTOR VEHICLES

The present invention relates to a pneumatic tire for motor vehicles with a tire profile formed by grooves molded into the tread surface of the tire and extending transverse to the circumferential direction of the tire.

A vehicle in motion can follow changes in its speed and direction only to such an extent as the adherence of the tires to the road surface will permit, and the power transferring capability of the respective contact surfaces depends in addition to the road conditions also to a considerable extent on the influences of the prevailing weather. It is a well known phenomenon that the tires when driving on roads which are heavily covered with water are sometimes no longer able to break through the water layer on the road and thus lose direct contact with the road surface. This condition always occurs instantaneously without previous warning, according a very dangerous condition; inasmuch as the tires are now supported only by a wedge-shaped film of accumulated liquid, this condition results practically in a breakdown of all guiding forces. This condition is generally called "hydroplaning," "floating" or "aquaplaning." Inasmuch as this condition occurs in conformity with the thickness of the water layer, the respective road condition, the tire profile and other undefined parameters at different driving speeds and cannot be predetermined for any specific case, numerous attempts and suggestions have been made in the past to prevent such a phenomenon which limits the driving safety to such a high degree. The leading idea and prevailing thought were to prevent the water film from forming between the tire and the road or to break up such film which causes the mentioned slip effect. However, all these efforts resulted at best in partial improvements but not in fundamental improvements.

It is, therefore, an object of the present invention by means of a new profile of the tire tread surface to prevent the formation of the above mentioned water film or water layer between the road and the tire contacting surfaces and thereby to greatly increase the driving safety of the vehicle in heavy rain, independently of the driving speed of the vehicle.

This object and other objects and advantages of the invention will appear more clearly from the following specification in connection with the accompanying drawing in which.

Figure 1:
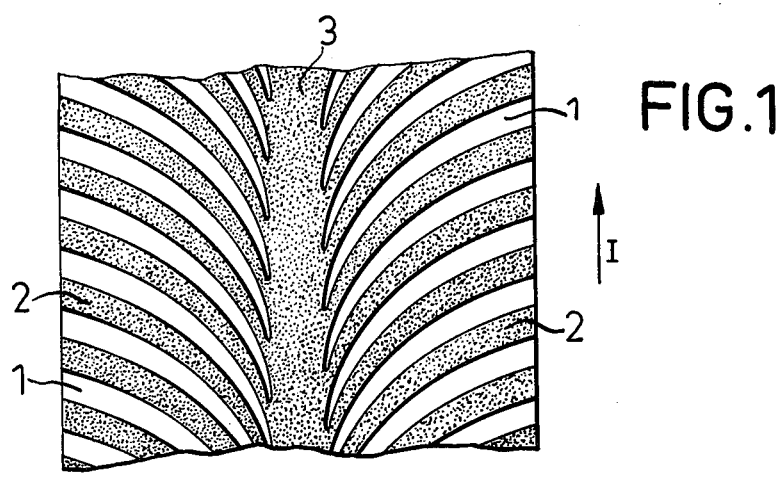
FIG. 1 illustrates a section of a pneumatic tire with a profile according to the invention.

The pneumatic tire according to the present invention is characterized primarily in that the grooves of the profile according to the invention extend from a circumferential section in the central tread surface region toward both sides of the tire, the curvature or course of the grooves following the course of a parabola of the second order. Such parabola is determined by the equation $x = y^2 x$ constant, in which $x$ is a coordinate extending in axial direction and $y$ is a coordinate extending in circumferential direction of the tire.

The invention takes advantage of the finding that the water which covers the road and enters into the tire profile cannot be displaced toward the front or toward the rear of the tire, but can be displaced only toward the sides of the tire. In a coordinate system projected on the contact surface of the tire tread surface with the road wherein the axis of the tire forms the abscissa and the circumference of the tire or the driving direction forms the ordinate, a certain water particle would, in case of an unimpeded flow possibility, under the influence of the acceleration $b$ to which it is subjected at its rest position by the tire rolling at a circumferential speed $v$, carry out a lateral escape movement in other words a movement in the direction of the axis of the tire, which lateral escape movement would be superimposed by the forward speed. This compound movement must in conformity with the laws of physics in the coordinate system which is visualized as stationary describe a curve according to the equation $x = (b/2v^2) y^2$. In this equation the factor $b/2v^2$ valid for a respective definite driving condition can generally be assumed to be a constant. This equation describes, however, a square parabola starting from the zero point of the coordinate system. This would mean that the water particles thrown out from the central area of the tire tread surface toward both sides in a direction transverse to the driving direction will in the thus curved profile encounter no flow resistance and will therefore be able in a minimum of time to flow off unimpededly. In this way the formation of a water film which can bring about the sliding or slipping effect between the tire and the road surface will be safely prevented, and the desired mechanical contact between the tire tread surface and the road surface will be maintained independently of the driving speed and of the amount of water on the road.

According to a further development of the invention it has proved advantageous to design the profile grooves so that their width continuously increases toward the side walls of the tire. The thus obtained increase in the available flow cross section of the grooves takes care of the increasing quantity of water conveyed in a profiled groove and increasing from the central circumferential portion of the tire toward the walls of the tire so that water cannot accumulate between the webs of a profiled groove.

According to a further development of the invention it is also possible to provide additional grooves extending at an angle to the parabolic grooves. Such additional grooves may, for instance, extend in or approximately in the circumferential direction of the tire.

Referring now to the drawing in detail, the tire shown in FIG. 1 has a molded-in profile in the form of parabolically curved grooves 1. The grooves 1 extend from a dividing strip 3 located in the central tread surface portion in circumferential direction of the tire and continue toward both sides of the tire in the direction toward the lateral walls of the tire. When viewed in circumferential direction of the tire, the width of the grooves continuously increases with increasing distance from the central strip 3. Between the grooves 1 which follow each other in circumferential direction of the tire, there are provided webs 2 which are evenly curved or which have the same curvature as the grooves and the width of which expediently is dimensioned in conformity with the size or width of the profiled grooves.

Figure 2:
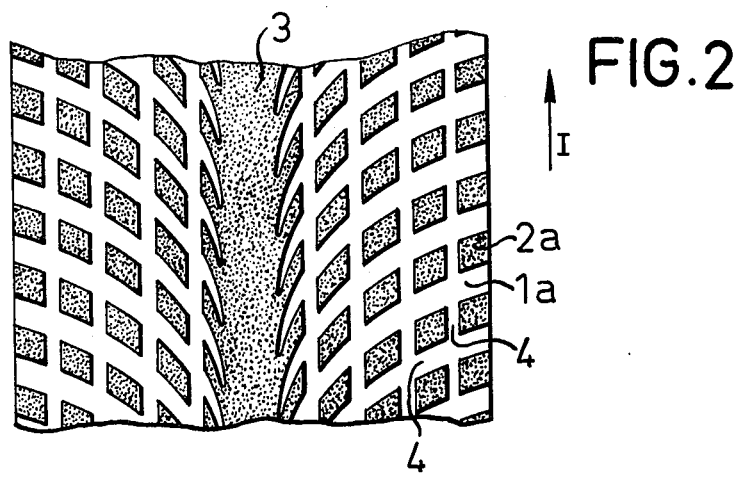
FIG. 2 illustrates a section of a modified profile according to the invention.

According to the modification illustrated in FIG. 2, there may be provided additional grooves 4 extending in the circumferential direction of the tire.

Figure 3:
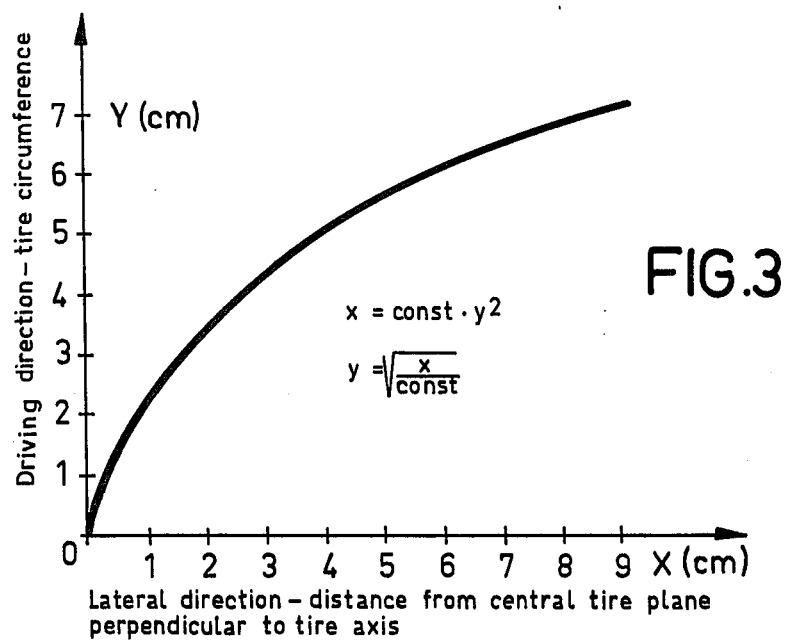
FIG. 3 is a graphic illustration of the curve determining the course of the profile grooves according to the invention.

The graphic illustration shown in FIG. 3 is based on a rectangular coordinate system projected on the contact surface of the tire with the road. The ordinate $y$ is located in conformity with the driving direction indicated by the arrow I in the center of the central strip 3 while the abscissa $x$ coincides with the axis of rotation of the tire. The water particles which are received by the grooves 1 at a circumferential speed $v$ of the tire (the driving speed) move at an accelerated speed $b$ from their rest position along a parabolic curve which is determined by the equation $x = (b/2v^2) y^2$ which equation also determines the curvature of the profiled grooves 1 according to the invention.

It is, of course, to be understood that the present invention is, by no means, limited to the spcific showing in the drawing but also comprises any modifications within the scope of the appended claims.

What I claim is:

1. A pneumatic tire for high speed motor vehicles upon hard road surfacing, which has a circumferential tread surface with a circumferential central section, said tread surface to protect against danger of hydroplaning being provided with grooves therein extending from said central section toward both sides of said tread surface and said grooves being curved along structural curvature of a parabola of the second order and being provided instantaneously to eliminate water effectively from said tread surface, the structural curvature of said grooves being determined mathematically by a functional equation $x = y^2 x$ constant, in which $x$ is the coordinate extending in the axial direction of said tire, and in which $y$ is the coordinate extending in the circumferential direction of said tire.

2. A pneumatic tire according to claim 1, in which the width of the tire grooves continuously increases with the decrease in the distance from the sides of the tire.

3. A pneumatic tire according to claim 2, in which the tread surface of said tire includes additional grooves intersecting said parabola curved grooves.

4. A pneumatic tire according to claim 3, in which said additional grooves extend peripherally at least approximately in the circumferential direction of said tire.

* * * * *